March 27, 1951 R. R. THATCHER 2,546,799
ADJUSTABLE REFERENCE VOLTAGE SYSTEM
Filed Sept. 28, 1949
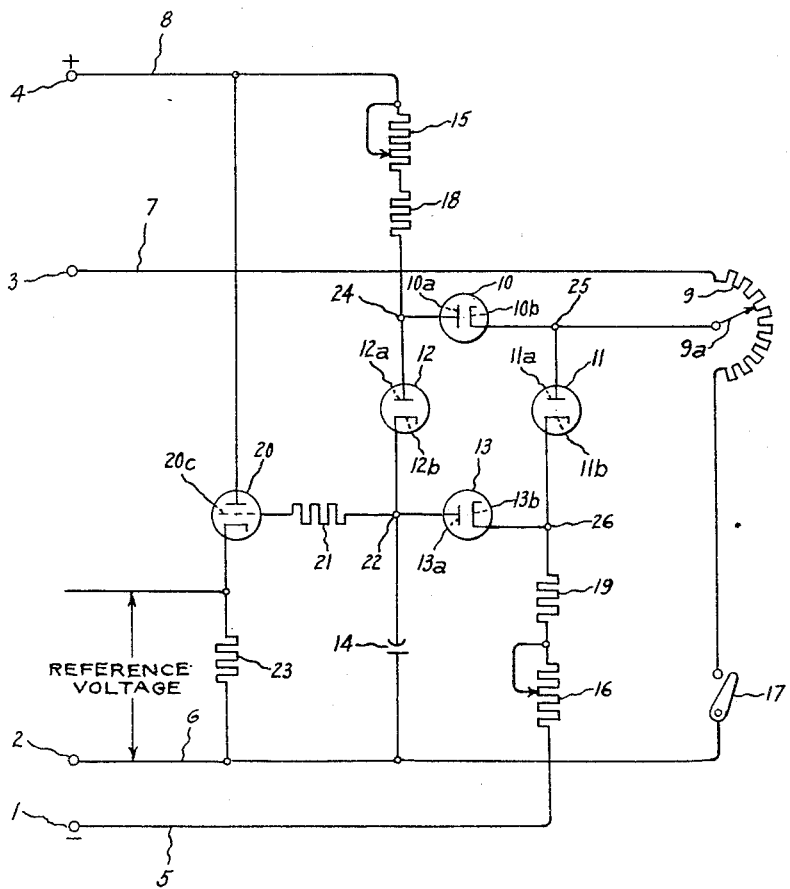
Inventor:
Robert R. Thatcher,
by Claude A. Mott.
His Attorney.

Patented Mar. 27, 1951

2,546,799

UNITED STATES PATENT OFFICE 2,546,799

ADJUSTABLE REFERENCE VOLTAGE SYSTEM

Robert R. Thatcher, Schenectady, N. Y., assignor to General Electric Company, a corporation of New York Application September 28, 1949, Serial No. 118,326

5 Claims. (Cl. 323—38)

This invention relates to an adjustable reference voltage unit for an electric motor speed control system wherein the motor speed is controlled proportionally to a reference voltage.

The adjustable reference voltage unit of this application is to be used in a motor speed control system such as that described in my co-pending patent application Serial 81,052, now Patent No. 2,507,198, filed jointly with Edward H. Dinger on March 12, 1949, and assigned to the same assignee as the present application. The speed of response of such a system to change or correct the speed of the motor being controlled may be very high. A high speed of response, in most instances, is desirable in order that the control may promptly correct for fluctuations in the desired constant speed due to changes in motor load. However, in this system, means is provided whereby the operator may manually change the speed reference voltage to thereby change the speed of the motor. This manual adjustment may be made over a relatively wide range in a very short period of time, thus requiring an injuriously excessive transient current in the windings of the controlled motor.

It is, therefore, an object of my invention to provide an adjustable reference voltage unit which will have a limited rate of change of the reference voltage independent of the speed with which the operator attempts to make the adjustment, without detracting from the efficiency or accuracy of the motor speed control or the speed of response of the system when a speed correction signal is required because of changing motor load or other conditions.

Accordingly, my invention consists generally of a reference voltage unit including an adjustable voltage potentiometer and a capacitor which is normally charged to the voltage of the potentiometer and uni-directional conducting devices such as electronic valves interposed between the potentiometer and the capacitor to prevent the capacitor from being charged or discharged through the potentiometer as the potentiometer is adjusted. Separate circuits are provided for charging or discharging the capacitor through the unidirectional conducting means at a limited rate when the capacitor voltage is not equal to the potentiometer voltage, the reference voltage unit output being derived from the capacitor.

For a better and more complete understanding of the invention, reference should now be had to the following specification and to the accompanying drawing of which the single figure is a schematic diagram of an embodiment of the invention.

Referring now to the drawing, terminals 1, 2, 3, and 4, represent sources of direct current voltage which are of successively increasing magnitude. That is, terminal 1 is the negative terminal and with respect to terminal 1, terminal 2 may be at 105 volts positive potential, terminal 3 at 210 volts, and terminal 4 at 310 volts. The voltages from terminal 1 through 4 are respectively conveyed to my adjustable reference voltage unit by conductors 5, 6, 7, and 8. The unit itself comprises a speed-controlling potentiometer 9, four diode electric valves 10, 11, 12, and 13, a capacitor 14, and rheostats 15 and 16 for varying the time constant of the capacitor circuits to control the rates of charge and discharge. Although the diode valves may be of any suitable type, they are preferably 6H6 rectifier valves.

The speed control potentiometer 9 is connected in series with the contacts of a switch 17 across the conductors 6 and 7. The valves 10 and 11 are connected in series relationship with each other and similarly valves 12 and 13 are connected in series relationship with each other and in parallel with the valves 10 and 11. The anodes 10a and 12a are connected through a resistor 18 and rheostat 15 to the positive supply conductor 8, and the cathodes 11b and 13b are connected through resistor 19 and rheostat 16 to the negative supply conductor 5.

As shown, the slider 9a of speed control potentiometer 9 is connected to the cathode 10b and anode 11a and capacitor 14 is connected between supply conductor 6 and the cathode 12b and anode 13a. Across the supply conductors 6 and 8 is connected an electric valve 20 of which the control grid 20c is connected through a resistor 21 to the junction point 22 of the cathode 12b and anode 13a. A resistor 23 connected in the cathode circuit of valve 20 provides cathode follower operation. The voltage which appears across the cathode follower resistor 23 is the reference voltage which is utilized for producing timed acceleration and deceleration of the motor which is controlled.

The reference voltage unit functions in the following manner to produce the reference voltage. In the steady state condition, the points indicated as 22, 24, 25 and 26 will be at approximately the same voltage. The resistors 18 and 19 are preferably of high impedance, that is, in the order of one half megohm each. With a total impedance of a megohm in the circuit, the tube drop of the valves 10, 11, 12 and 13 is negligible. Valve 10 prevents the voltage at point 24, from becoming more positive than the voltage of point 25. Similarly valve 11 prevents the voltage at point 26 from becoming more negative than point 25. The conducting action of valves 12 and 13 hold the voltage at point 22 equal to the voltage at points 24 and 26. When the voltage at point 25 is made more positive by movement of the slider 9a in the counterclockwise direction, the voltage at point 26 also becomes more positive owing to the action of valve 11. This results in cutting off valves 10 and 13 since the voltages of points 24 and 22 are maintained unchanged momentarily by the charge on capacitor 14. With valves 10 and 13 cut off, capacitor 14 begins to charge through valve 12, resistor 18, and rheostat 15 at a rate determined by the setting of the rheostat, and the voltage across its terminals increases correspondingly. Responsively to this increasing voltage the conduction of valve 20 is increased thereby increasing the voltage drop across resistor 23 until the voltage at the cathode of valve 20 is substantially equal to the voltage of the grid which is equal to the voltage of the point 22. In other words, the voltage across the resistor 23 changes with the voltage across the capacitor 14 and at the same rate. Valve 10 begins to conduct again when the voltage at point 24 has increased to the value of the voltage at point 25, thereby to prevent any further increase of voltage at points 24 and 22 and the circuit returns to the steady state condition.

Upon movement of the slider 9a in a clockwise direction to a position of less positive voltage on the potentiometer, the voltage at point 24 is made correspondingly less positive by the action of valve 10. This results in the cut-off of valves 11 and 12 since the voltage at the points 22 and 26 is instantaneously maintained by the charge on the capacitor. With valves 11 and 12 cut off, the capacitor 14 begins to discharge through valve 13, resistor 19 and rheostat 16 at a rate determined by the setting of the rheostat. Simultaneously, the reference voltage across the cathode follower resistor 23 will decrease as the voltage across the capacitor decreases and at the same rate. Valve 11 conducts again when the voltages at point 26 has decreased to the voltage at point 25. This prevents any further decrease in the voltage at the points 22 and 26 and the circuit is returned to the steady state condition. Thus, the reference voltage unit produces across the resistor 23 an adjustable reference voltage having rates of increase or decrease which can be separately varied by adjustment of rheostats 15 and 16, respectively.

It will be seen from the above description that I have provided for a relatively simple and economical, though reliable, adjustable reference voltage unit employing one capacitor for limiting the rate of change of the reference voltage. While I have shown a particular embodiment of my invention, it will, of course, be understood that I do not wish to be limited thereto since different modifications both in the circuit arrangement and in the instrumentalities employed may be made, and I contemplate by the appended claims to cover any such modifications as fall within the true spirit and scope of my invention.

What I claim as new and desire to secure by Letters Patent of the United States is:

1. An adjustable direct current voltage supply unit comprising an adjustable voltage potentiometer and having adjustable voltage output terminal connections, a capacitor connected in circuit between said potentiometer and said output terminals and adapted to be charged to a voltage corresponding to the setting of said potentiometer, four uni-directional conducting devices arranged in a bridge circuit configuration and connected at diametrically opposite corners to said capacitor and said potentiometer, capacitor charging and discharging circuits respectively connected to the remaining corners of said bridge circuit configuration and having separately adjustable resistances therein, said uni-directional conducting devices being connected with polarities to provide two parallel current conducting paths between said charging and discharging circuits, the adjustment of said potentiometer determining the voltage charge level of said capacitor through control of conduction of said uni-directional conducting devices by said potentiometer.

2. An adjustable reference voltage unit comprising a grid controlled electronic valve having a cathode follower resistor across which the reference voltage appears, a capacitor connected to apply a capacitor charge voltage to a control grid of said electronic valve, a charging circuit for said capacitor comprising a first uni-directional conducting device and an adjustable resistance for adjusting the charging rate of said capacitor, a capacitor discharging circuit including a second uni-directional conducting device and a second adjustable resistance for separately adjustably controlling the discharge rate of said capacitor, the rate of change of said capacitor voltage and said reference voltage being thereby adjustably limited, a reference voltage setting potentiometer having an adjustable center tap, a third uni-directional conducting device connected between said adjustable center tap and the junction between said first uni-directional conducting device and said adjustable capacitor charging circuit resistor, a fourth uni-directional conducting device connected between said adjustable center tap and the junction between said second uni-directional conducting device and said adjustable discharge circuit resistor, said second and third uni-directional conducting devices being adapted to prevent charging of said capacitor by said potentiometer and to allow charging by said capacitor charging circuit, and said first and fourth uni-directional conducting devices being adapted to prevent discharge of said capacitor by said potentiometer and to allow discharging by said discharging circuit, the ultimate level of charge on said capacitor nevertheless being determined by the adjustment of said potentiometer whereby the potentiometer controls the magnitude of the reference voltage, but with a limited rate of change of said reference voltage as independently determined by said capacitor charging and discharging resistances upon sudden changes in the adjustment of said potentiometer.

3. An adjustable reference voltage unit having predetermined maximum rates of voltage change and comprising a first pair of series-connected unidirectional conducting devices, a capacitor connected at the common connection of said devices, one of said devices comprising a charging path and the other of said devices comprising a discharging path for said capacitor, separate impedances connected in series in said charging and discharging paths for separately determining the charge and discharge rates of said capacitor, a second pair of series-connected unidirectional conducting devices connected in parallel with said first pair of unidirectional conducting devices and an adjustable source of voltage connected to the common connection of said second pair of devices for controlling the voltage level of charge of said capacitor.

4. An adjustable reference voltage unit having predeterminable maximum voltage change rate limits and comprising a first pair of series-connected unidirectional conducting devices, a capacitor connected at the common connection of said devices, one of said devices comprising a charging path and the other of said devices comprising a discharging path for said capacitor, separate impedances connected in series in said charging and discharging paths for separately determining the charge and discharge rates of said capacitor, a second pair of series-connected unidirectional conducting devices connected in parallel with said first pair of unidirectional conducting devices and a potentiometer adapted for connection to a source of voltage and having an adjustable center tap connected to the common connection of said second pair of devices for controlling the voltage level of charge of said capacitor.

5. An adjustable reference voltage unit comprising a capacitor, a charging circuit for said capacitor comprising a first unidirectional conducting device and an adjustable resistance for adjusting the charging rate of said capacitor, a capacitor discharging circuit including a second unidirectional conducting device and a second adjustable resistance for separately adjustably controlling the discharge rate of said capacitor, the rate of change of said capacitor voltage being thereby adjustably limited, a voltage setting potentiometer having an adjustable center tap, a third unidirectional conducting device connected between said adjustable center tap and the junction between said first unidirectional conducting device and said adjustable capacitor charging circuit resistor, a fourth unidirectional conducting device connected between said adjustable center tap and the junction between said second unidirectional conducting device and said adjustable discharge circuit resistor, said second and third unidirectional conducting devices being connected with polarities to prevent current flow for charging said capacitor from said potentiometer, and said first and fourth unidirectional conducting devices being connected with polarities to prevent current flow for discharging said capacitor from said potentiometer, said charge and discharge currents being thereby restricted respectively to said charge and discharge circuits, the ultimate level of charge voltage on said capacitor being determined by the adjustment of said potentiometer whereby the potentiometer controls the magnitude of the reference voltage, but with a limited rate of change of said reference voltage as independently determined by said capacitor charging and discharging resistances in response to sudden changes in the adjustment of said potentiometer.

ROBERT R. THATCHER.

REFERENCES CITED

The following references are of record in the file of this patent:

UNITED STATES PATENTS

| Number | Name | Date |
|---|---|---|
| 2,480,795 | Wagner et al. | Aug. 30, 1949 |
| 2,487,510 | Baker | Mar. 8, 1949 |